United States Patent [19]

Boyen et al.

[11] Patent Number: 5,562,005
[45] Date of Patent: Oct. 8, 1996

[54] PROTECTIVE BELLOWS

[75] Inventors: Remi Boyen, Nantes; Jacques Houis, Thouare Sur Loire, both of France

[73] Assignee: Draftex Industries Limited, Edinburgh, Scotland

[21] Appl. No.: 378,471

[22] Filed: Jan. 26, 1995

[30]     Foreign Application Priority Data

Feb. 24, 1994 [GB] United Kingdom ............... 9403502

[51] Int. Cl.⁶ ............................................. F16J 15/52
[52] U.S. Cl. ............... 74/18.2; 29/450; 277/212 FB; 403/50
[58] Field of Search ................... 74/18, 18.1, 18.2; 29/450; 277/212 FB; 403/50, 51; 464/175

[56]          References Cited

U.S. PATENT DOCUMENTS

| | | | |
|---|---|---|---|
| 4,537,289 | 8/1985 | VonGrunberg et al. | 74/18.2 X |
| 4,556,399 | 12/1985 | Billet et al. | 464/175 |
| 4,560,178 | 12/1985 | Hempel | 277/212 FB |
| 4,852,891 | 8/1989 | Sugiura et al. | 277/212 FB |
| 4,927,678 | 5/1990 | Lallement | 74/18 X |
| 4,967,609 | 11/1990 | Takagi et al. | 74/18.1 X |
| 5,051,105 | 9/1991 | Sugiura et al. | 277/212 FB |

FOREIGN PATENT DOCUMENTS

| | | |
|---|---|---|
| 0487840 | 9/1991 | European Pat. Off. . |
| 0506125 | 9/1992 | European Pat. Off. . |
| 8807327 | 6/1988 | Germany . |

*Primary Examiner*—Allan D. Herrmann
*Attorney, Agent, or Firm*—Leydig, Voit & Mayer, LTD.

[57]          ABSTRACT

A protective bellows for protecting the steering mechanism of a motor vehicle body is shown. The bellows has a fixing collar for gripping the outside of the casing of the steering mechanism, and a fixing collar for gripping a mounting region of the steering rod. In order to be fitted into position, however, the fixing collar has to be stretched to pass over a boss of enlarged diameter. The bellows is produced by blow-moulding from EPDM-polypropylene or similar thermoplastic material. Because of the lesser resilience of this material, compared with previously used materials such as thermoplastic polyurethane, the initial diameter of the fixing collar has to be selected in dependence on the relative values for the diameters of the boss and the mounting region in order to ensure that the pressure with which the fixing collar grips the mounting region provides adequate sealing not only initially but throughout the expected life of the bellows.

5 Claims, 2 Drawing Sheets

PROTECTIVE BELLOWS

BACKGROUND OF THE INVENTION

The invention relates to protective bellows. One particular example of a protective bellows embodying the invention, and to be described in more detail below, is a bellows for protecting the steering mechanism of a motor vehicle.

SUMMARY OF THE INVENTION

According to the invention, there is provided a protective bellows made of thermoplastic material, having an integral fixing collar at at least one of its ends which has to be stretched over an intermediate surface of diameter A in order to be mounted onto a mounting surface of diameter B where diameter A is greater than diameter B, the initial diameter of the fixing collar being so selected in relation to the diameter A that the pressure which the resiled fixing collar exerts on the mounting surface exceeds a predetermined minimum value throughout the expected life of the bellows.

DESCRIPTION OF DRAWINGS

Protective bellows embodying the invention will now be described by way of example only, with reference to the accompanying diagrammatic drawings in which.

DESCRIPTION OF PREFERRED EMBODIMENTS

Figure 1:
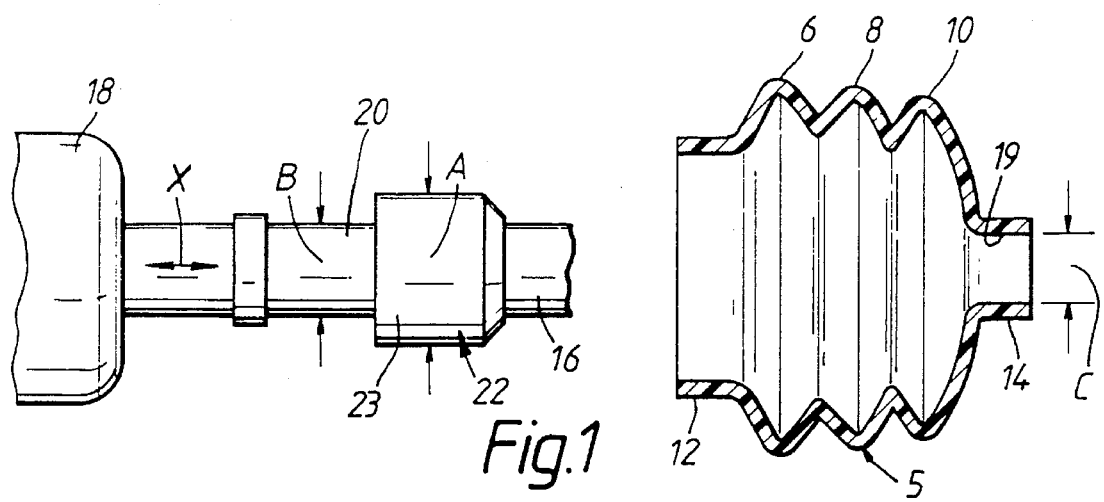
FIG. 1 illustrates one of the bellows in cross-section and shows it being fitted into position on the steering mechanism of a vehicle.

The protective bellows to be described in more detail below is for protecting the steering mechanism in a motor vehicle body. The bellows is shown diagrammatically at 5 in FIG. 1 and comprises a plurality of bellows turns 6,8 and 10 (but there may be more or less than this number of turns in practice), together with fixing collars 12 and 14 at each of its ends. The bellows is for protecting a steering rod 16 where it emerges from a casing 18 containing the manually, mechanically or hydraulically operated steering mechanism. The mechanism causes the steering rod 16 to move in an axial direction (as indicated by arrows X) for controlling the steering angle of one of the front wheels of the motor vehicle. A similar steering rod projects from the opposite end of the casing 18 and is for controlling the steering angle of the other front wheel (and is protected by a bellows similar to the bellows 5).

The bellows 5 is to be fitted onto the casing 18 and the rod 16 so that the collar 12 surrounds and is secured to the outside of the casing 18 and so that the internal surface 19 of the collar 14 surrounds and is secured to a fixing region of the rod 16 which defines a mounting surface 20. As illustrated, though, the rod includes a boss 22 presenting an intermediate surface 23 whose diameter A is greater than the diameter "B" of the mounting surface 20 of the rod.

Figure 2:
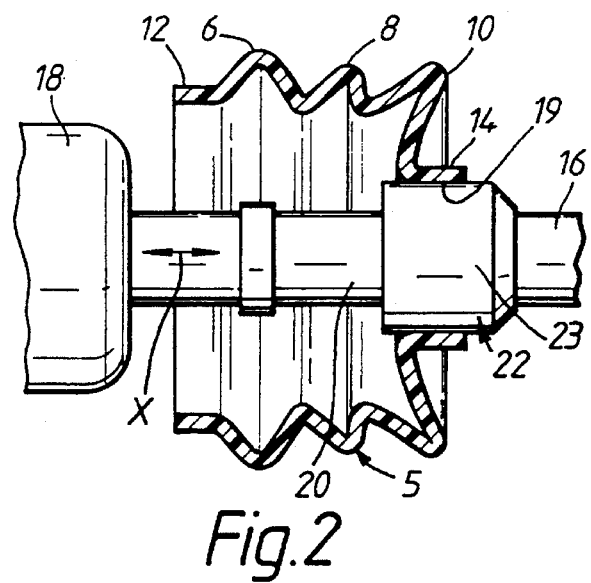
FIG. 2 corresponds to FIG. 1 but shows a later stage in the fitting process.
Figure 3:
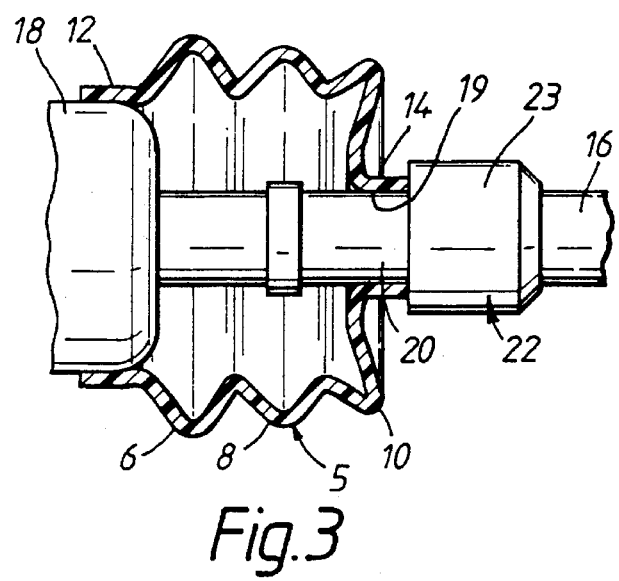
FIG. 3 corresponds to FIGS. 1 and 2 but shows the completion of the fitting process.

As shown in FIGS. 2 and 3, therefore, the fitting process involves stretching the fixing collar 14 so as to increase its internal diameter C (see FIG. 1) and thereby to enable the fixing collar to pass over the boss 22 until it becomes positioned over the mounting surface region 20 of the rod 16 as shown in FIG. 3. At the same time, the fixing collar 12 contacts the circumferential surface of the casing 18. The collars 12 and 14 are sized to hold themselves resiliently in position.

It is advantageous to produce the bellows by blow-moulding from EPDM-polypropylene material or material of similar type, because such material has a lower cost than materials previously used such as thermoplastic polyurethane. However, polyurethane has greater elasticity than EPDM-polypropylene. If EPDM-polypropylene is used for the bellows 5, special dimensioning of the bellows is necessary, as will now be explained, in order to enable the material to cope with the stretching which is necessary to enable the fixing collar 14 to pass over the boss 22 (FIG. 2).

Figure 4:
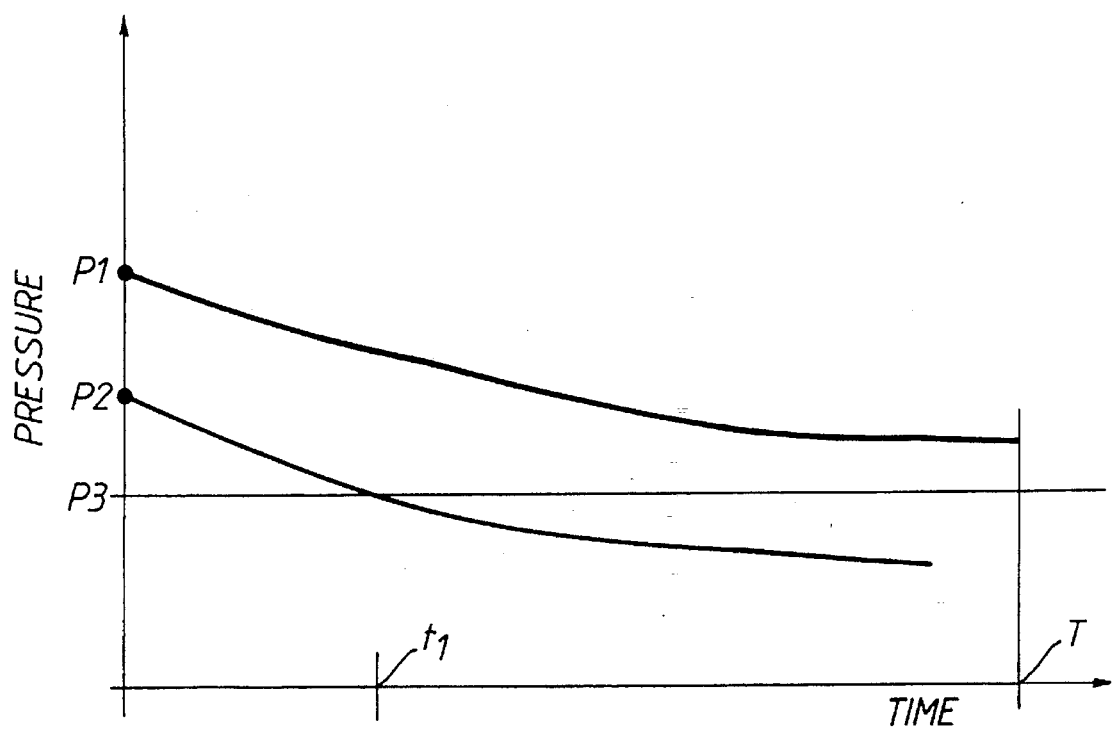
FIGS. 4 and 5 are graphs for explaining the operation of the bellows.

FIG. 4 plots the pressure applied by the fixing collar 14 to the mounting surface 20 of the shaft 16 as it varies during the life of the bellows—the applied pressure falling off during this time because of ageing effects in the material. The pressure value P3 is the minimum pressure necessary to ensure proper sealing of the bellows on the rod 16. As indicated in FIG. 4, if the initial value of the pressure applied by the fixing collar 14 to the mounting surface 20 of the rod 16 is P2, then there will be adequate sealing over the first part of the life of the bellows. However, FIG. 4 shows that, at a time $t_1$, the pressure has fallen below the limit value P3, and adequate sealing is no longer available. However, if the initial value of the pressure is P1, FIG. 4 shows that the pressure will be maintained above the minimum level P3 at least until a time T which is the maximum life of the bellows. The relationship between initial pressure value and final pressure value is determined by the material (EPDM-polypropylene) and the production technique used (blow-moulding). Therefore, if the bellows is produced by blow-moulding from EPDM-polypropylene, it is necessary to ensure that the initial pressure applied by the fixing collar 14 to the rod mounting surface 20 has a value of P1 at least—and the pressure will then be maintained above the minimum level for the life of the bellows.

Figure 5:
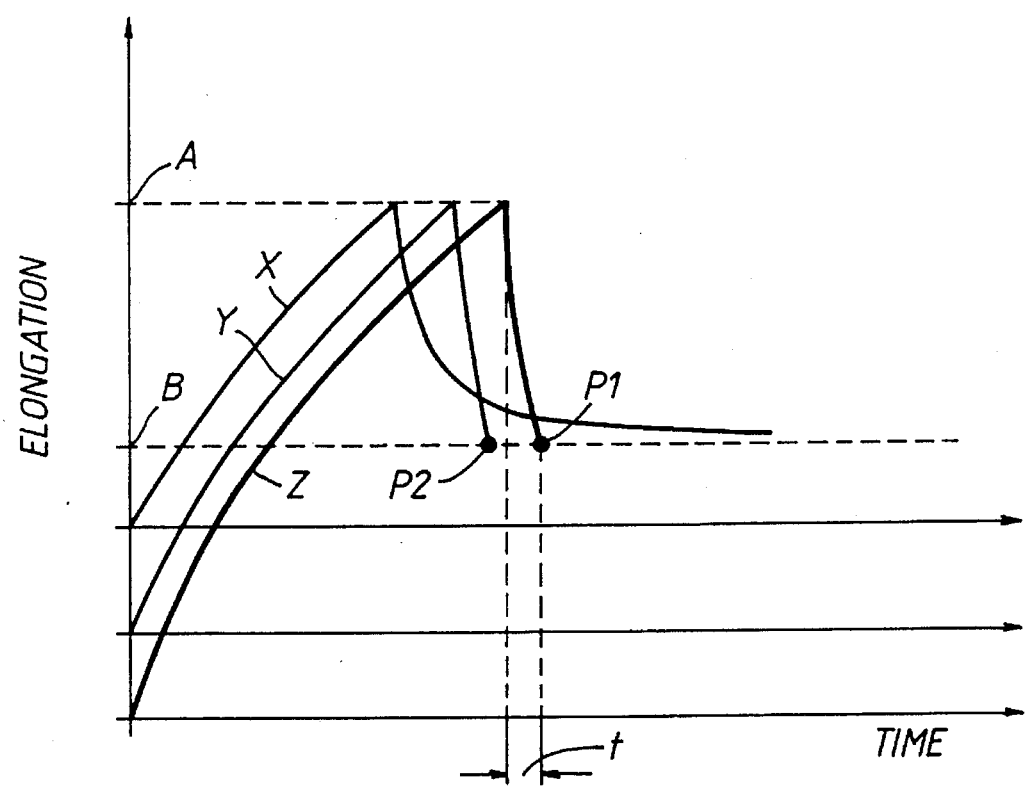

FIG. 5 shows graphs plotting the stretching and resiling of the bellows material (vertical axis) against time (horizontal axis). The point B on the vertical axis represents the value of the diameter B (see FIGS. 1 to 3) of the rod mounting surface 20. Point A on the vertical axis represents the value of diameter A (FIGS. 1 to 3), being the diameter of the boss 22.

The curve X relates to a bellows for which the initial diameter of the collar 14 is "X". The diameter X is relatively small, and the effect of this is that the material becomes so stretched in passing over the boss 22 that, as shown by curve X, the diameter never resiles to the value B (the diameter of the rod mounting surface 20). Therefore, the bellows provides unsatisfactory sealing— even at the beginning of the life of the bellows.

Curve Y corresponds to Curve X but relates to a bellows for which the diameter of the fixing collar 14 initially is Y. Curve Y shows how the material is stretched to pass over the diameter A of the boss 22 and then resiles back to the diameter B of the mounting surface 20. In this case, however, the pressure which the collar 14 applies to the mounting surface 20 of the rod 16 has the value P2. As shown by FIG. 4, this pressure is unsatisfactory because it will fall below the minimum value P3 during the life of the bellows.

Finally, curve Z relates to a bellows for which the initial diameter of the fixing collar 14 is Z. Again, the curve shows how the fixing collar is stretched to pass over the boss 22 with diameter A and then resiles to diameter B, the diameter of the mounting region 22 of the shaft. In this case, the pressure applied to the mounting region 20 is P1. As shown in FIG. 4, this value will provide proper sealing throughout the life of the bellows.

The time period t in FIG. 5 shows the period during which the stretched collar resiles to grip the mounting surface 20. This time period needs to very short in order to ensure satisfactory fitting.

It has been found that when the ratio of diameter A to diameter B lies between 1.4 and 1.8, the desired initial gripping pressure P1 is achieved when diameter Z satisfies the following relationship:

$$1.2 < (A-Z)/Z < 2$$

What is claimed is:

1. In combination, a protective bellows made of thermoplastic material and mounting means defining a circumferentially extending mounting surface of predetermined diameter to which the bellows is to be fitted, the bellows comprising bellows means extending between two ends and an integral fixing collar at one of said ends, the fixing collar defining an internal surface sized to resiliently grip the mounting surface, the mounting means comprising means positioning the mounting surface adjacent means defining an intermediate circumferentially extending surface of predetermined diameter greater than the diameter of the mounting surface so that the fixing collar has to be stretched to pass over the intermediate surface and then resiles onto the mounting surface, the internal diameter of the fixing collar being so selected in relation to the diameter of the intermediate surface and in relation to the said material that the pressure which the resiled fixing collar exerts on the mounting surface exceeds a predetermined minimum value throughout the expected life of the bellows.

2. The combination according to claim 1, in which the material of the bellows is EPDM-polypropylene.

3. The combination according to claim 1, in which the ratio of the diameter of the intermediate surface to the diameter of the mounting surface lies between 1.4 and 1.8, and the ratio of the difference between the diameter of the intermediate surface and the internal diameter of the fixing collar to the internal diameter of the fixing collar lies between 1.2 and 2.

4. The combination according to claim 1, in which the means defining the mounting surface is a vehicle steering mechanism rod and the mounting surface is the surface of the steering mechanism rod, and in which the means defining the intermediate surface is a boss on the steering mechanism rod.

5. The combination according to claim 4, including a fixing collar at the other end of the bellows which is adapted to be secured around a casing for the steering mechanism from which protrudes the said rod.

\* \* \* \* \*